US010560990B1

(12) United States Patent
Fragiacomo et al.

(10) Patent No.: US 10,560,990 B1
(45) Date of Patent: Feb. 11, 2020

(54) LIGHT EMITTING DIODE CIRCUIT WITH ACCURATE CURRENT MONITORING OF TWO OR MORE DIFFERENT LED STRINGS

(71) Applicant: Infineon Technologies AG, Neubiberg (DE)

(72) Inventors: Fabio Fragiacomo, Montegrotto Terme (IT); Paolo Milanesi, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/396,062

(22) Filed: Apr. 26, 2019

(51) Int. Cl.
  *H05B 33/08* (2006.01)
  *B60Q 1/00* (2006.01)
  *B60Q 11/00* (2006.01)
  *B60Q 1/04* (2006.01)

(52) U.S. Cl.
  CPC ....... *H05B 33/0815* (2013.01); *B60Q 1/0076* (2013.01); *B60Q 1/04* (2013.01); *B60Q 11/005* (2013.01); *H05B 33/089* (2013.01); *H05B 33/0827* (2013.01); *B60Q 2400/30* (2013.01)

(58) Field of Classification Search
  CPC ............ H05B 33/0815; H05B 33/0827; H05B 33/0884; H05B 33/0851; H05B 33/0818; H05B 33/0887; H05B 33/0845; H05B 37/02; H05B 37/029; Y02B 20/341; Y02B 20/346; Y02B 20/347; B60Q 1/04; B60Q 1/0076; B60Q 11/005; B60Q 2400/30
  See application file for complete search history.

(56) References Cited

U.S. PATENT DOCUMENTS

| 8,791,647 | B2 * | 7/2014 | Kesterson | H05B 33/0815 |
| | | | | 315/291 |
| 8,947,343 | B2 * | 2/2015 | Kim | G09G 3/006 |
| | | | | 345/102 |
| 9,041,310 | B2 * | 5/2015 | Lin | H05B 33/0887 |
| | | | | 315/247 |
| 9,445,475 | B1 * | 9/2016 | Sutardja | H05B 33/0857 |
| 9,820,343 | B1 * | 11/2017 | Fragiacomo | B60Q 1/04 |
| 10,085,314 | B1 * | 9/2018 | Milanesi | H05B 33/0815 |
| 10,264,637 | B2 * | 4/2019 | van de Ven | H05B 33/083 |

OTHER PUBLICATIONS

Szolusha et al., "Single 2 MHz Buck-Boost Controller Drives Entire LED Headlight Cluster, Meets CISPR 25 Class 5 EMI," Analog Dialogue, May 2018, 6 pp.

* cited by examiner

*Primary Examiner* — Haissa Philogene
(74) *Attorney, Agent, or Firm* — Shumaker & Sieffert, P.A.

(57) ABSTRACT

This disclosure is directed to a light emitting diode (LED) circuit for driving two or more different LED strings, which may be controlled in a complimentary fashion. The LED circuit includes current monitoring capabilities that are configured to monitor current through the two or more different LED strings. The circuit is designed in a way that can reduce or eliminate excessive sensing pins that are otherwise needed for the current monitoring. According to this disclosure, for example, very accurate current monitoring can be achieved by using two or more sensing resistors while only using two sensing pins for the current monitoring through two or more different LED strings.

20 Claims, 9 Drawing Sheets

LIGHT EMITTING DIODE CIRCUIT WITH ACCURATE CURRENT MONITORING OF TWO OR MORE DIFFERENT LED STRINGS

TECHNICAL FIELD

This disclosure relates circuits for driving and controlling strings of light emitting diodes.

BACKGROUND

Drivers are often used to control a voltage, current, or power at a load. For instance, a light emitting diode (LED) driver may control the power supplied to a string of light emitting diodes. Some drivers may include a DC to DC power converter, such as a buck-boost, buck, boost, or another DC to DC converter. Such DC to DC power converters may be used to control and possibly change the power at the load based on a characteristic of the load. DC to DC power converters may be especially useful for regulating current through LED strings.

Some LED circuits include multiple strings of LEDs that are powered by a common LED driver. In such cases, control circuits may useful to allow for selection and control of different strings of LEDs at different times. Accordingly, LED drivers may include a DC to DC power converter and a controller that is configured to control switches that can electrically couple different strings of the LEDs to the LED driver. The switches may be used to select different strings of LEDs at different times, and the switches may also be controlled to define duty cycles of the different strings of LEDS in order to more effectively control the power that is delivered to the different LED strings.

SUMMARY

In general, this disclosure is directed to a light emitting diode (LED) circuit for driving two or more different LED strings. The LED circuit includes current monitoring capabilities that are configured to monitor current through the two or more different LED strings. The circuit is designed in a way that can reduce or eliminate excessive sensing pins that are otherwise needed for the current monitoring. According to this disclosure, for example, very accurate current monitoring can be achieved with two or more sensing resistors while using only two sensing pins for the current monitoring through two or more different LED strings.

In some examples, this disclosure describes a circuit configured to monitor current through two or more strings of light emitting diodes. The circuit may include a power converter and a first current sensing resistor, wherein the first current sensing resistor is positioned between a first node and a second node of the circuit. The circuit may also include a second current sensing resistor connected in series with the first current sensing resistor, wherein the second current sensing resistor is positioned between the second node and a third node of the circuit. In addition, the circuit may include a first electrical contact element at the first node and a second electrical contact element at the third node, wherein the first electrical contact element and the second electrical contact element are coupled to the power converter. Current from the power converter flows through a first LED string and a second LED string in a complimentary fashion such that when current flows through the first LED string, approximately zero current flows through the second LED string, and when current flows through the second LED string, approximately zero current flows through the first LED string. A voltage drop between the first electrical contact element and the second electrical contact element is defined by the first current sensing resistor when current flows through the first LED string, and the voltage drop between the first electrical contact element and the second electrical contact element is defined by the first current sensing resistor and the second current sensing resistor when current flows through the second LED string.

In some examples, this disclosure describes a system comprising a first LED string, a second LED string positioned in parallel with the first LED string, and a circuit configured to monitor current through the first LED string and the second LED string. The circuit comprises a power converter, and a first current sensing resistor, wherein the first current sensing resistor is positioned between a first node and a second node of the circuit. The circuit also includes a second current sensing resistor connected in series with the first current sensing resistor, wherein the second current sensing resistor is positioned between the second node and a third node of the circuit. In addition, the circuit includes a first electrical contact element at the first node and a second electrical contact element at the third node, wherein the first electrical contact element and the second electrical contact element are coupled to the power converter. Current from the power converter flows through the first LED string and the second LED string in a complimentary fashion, such that when current flows through the first LED string, approximately zero current flows through the second LED string, and when current flows through the second LED string, approximately zero current flows through the first LED string. A voltage drop between the first electrical contact element and the second electrical contact element is defined by the first current sensing resistor when current flows through the first LED string. The voltage drop between the first electrical contact element and the second electrical contact element is defined by the first current sensing resistor and the second current sensing resistor when current flows through the second LED string.

In some examples, this disclosure describes a method that comprises delivering current through a first LED string and a second LED string in a complimentary fashion, such that when current flows through the first LED string, approximately zero current flows through the second LED string, and when current flows through the second LED string, approximately zero current flows through the first LED string. The method also includes measuring first current flow through the first LED string based on a first voltage difference between a first electrical contact and a second electrical contact, wherein the first voltage difference is based on a drop across a first current sensing resistor. In addition, the method includes measuring second current flow through the second LED string based on a second voltage difference between the first electrical contact and the second electrical contact, wherein the second voltage difference is based on a voltage drop across both the first current sensing resistor and a second current sensing resistor.

Details of these and other examples are set forth in the accompanying drawings and the description below. Other features, objects, and advantages will be apparent from the description and drawings, and from the claims.

DETAILED DESCRIPTION

Some systems may use a power converter, such as a direct current (DC) to DC converter to control current supplied to a string of light emitting diodes (LEDs). This disclosure is directed to an LED circuit for driving two or more different LED strings, which may be controlled in a complimentary fashion. The LED circuit includes current monitoring capabilities that are configured to monitor current through the two or more different LED strings. The circuit is designed in a way that may reduce or eliminate excessive sensing pins that are otherwise needed for the current monitoring. According to this disclosure, for example, very accurate current monitoring can be achieved by using two or more sensing resistors while only using two sensing pins for the current monitoring through two or more different LED strings. The techniques and circuits described herein may be especially useful with vehicle lighting applications that include multiple strings of LEDs.

Figure 1:
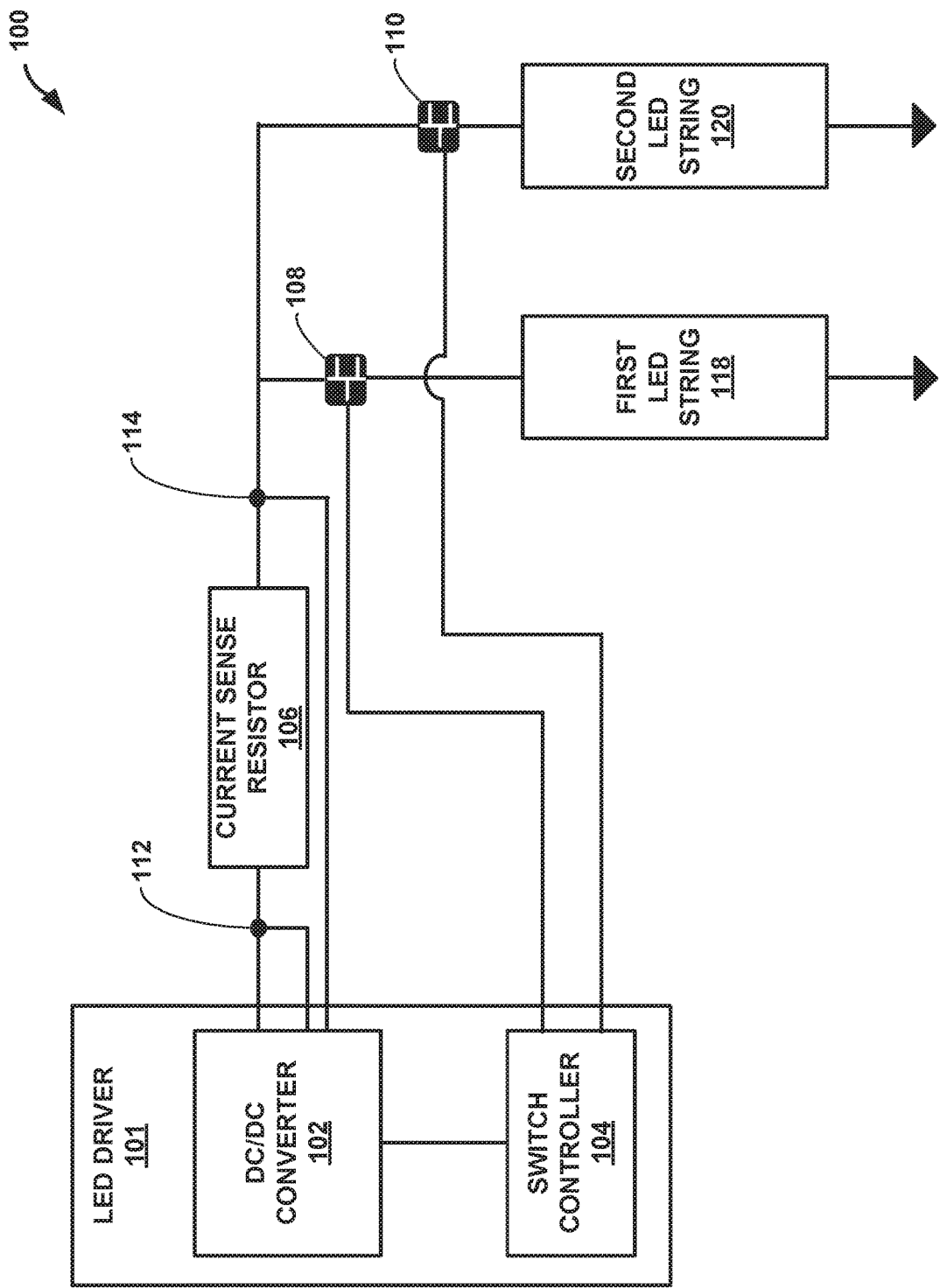
FIG. 1 is a block diagram illustrating one example light emitting diode (LED) circuit that can control and monitor current through two different complimentary LED strings.

FIG. 1 is a block diagram illustrating an example system 100 including a first LED string 118 and a second LED string 120 and an LED driver 101. LED driver 101 includes a DC/DC converter 102 that is configured to regulate current through the first LED string 118 and the second LED string 120. LED driver 101 may also include a switch controller 104 that is configured to control switches 108 and 110 so as to control current flow through the first LED string 118 and the second LED string 120. In some examples, the phrase "LED string" refers to a plurality of LEDs that are coupled in series.

First LED string 118 and second LED string 120 may be controlled in a complimentary fashion by controlling switches 108 and 110. Switch controller 104 may control switch 108 to be in an on state while controlling switch 110 to be in an off state. Alternatively, switch controller 104 may control switch 108 to be in an off state while controlling switch 110 to be in an on state. In this way, switch controller 104 controls LED string 118 and second LED string 120 in a complimentary fashion, ensuring that both LED strings are not receiving substantial amounts of current at the same time. Switches 108 and 110 may be used to select different strings of LEDs at different times, and in some cases, switches 108 and 110 may be controlled to define duty cycles of first LED string 118 and second LED string 120 in order to more effectively control the power that is delivered to the different LED strings.

As examples, each of switches 108 and 110 may comprise a Field Effect Transistor (FET), a bipolar junction transistor (BJT), a gallium nitride (GaN) switch, or possibly a silicon controlled rectifier (SCR). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same.

In order to monitor and sense current flow through first LED string 118 and through second LED string 120, the circuit shown in FIG. 1 includes a current sense resistor 106 and two current sensing pins at nodes 112 and 114. The current sensing pins at nodes 112 and 114 are electrical contacts that couple to DC/DC converter 102. DC/DC converter 102 can monitor the voltage drop from node 112 to node 114. Based on the resistance of resistor 106 and the voltage drop from node 112 to node 114, DC/DC converter 102 can determine the current flow through first LED string 118 and the current flow through second LED string based on Ohm's law.

In many situations, however, DC/DC converter 102 may be configured to supply different amounts of current to first LED string 118 and to second LED string. This issue of supplying different amounts of current can present challenges for accurate current monitoring. For example, DC/DC converter 102 may be configured to supply 1.5 amps to first LED string 118 (e.g., corresponding to a dimming level of 100 percent), and may then be configured to deliver 0.15 amps to second LED string (corresponding to a dimming level of 10 percent). In this example, the accuracy of current measurements using current sense resistor 106 may drastically vary between the two configurations. When supplying 1.5 amps to the first LED string 118, the accuracy of current measurement through current sense resistor 106 may be within approximately 3 percent. In contrast, when supplying 0.15 amps to the second LED string 120, the accuracy of current measurement through current sense resistor 106 may only be within approximately 10 percent. This issue can be very significant when the maximum amount of current to one LED string varies drastically with the minimum amount of current delivered to another complimentary string of LEDs.

Figure 2:
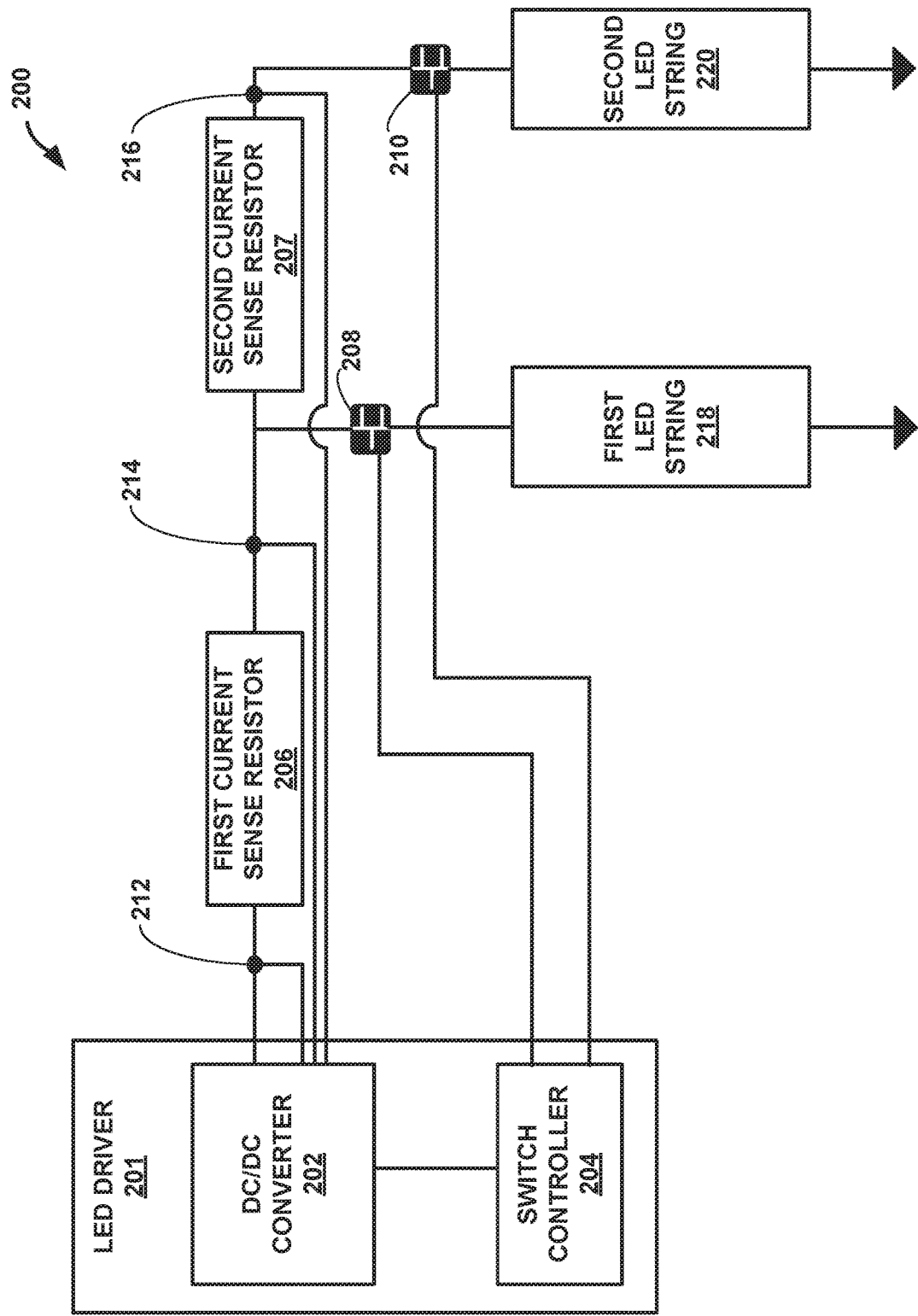
FIG. 2 is another block diagram illustrating another example LED circuit that can control and monitor current through two different complimentary LED strings.

FIG. 2 is another block diagram illustrating another example LED circuit that can control and monitor current through two different complimentary LED strings. LED system 200 of FIG. 2 is very similar to LED system 100 in some respects. LED driver 201 may be similar to LED driver 101. DC/DC converter 202 is similar to DC/DC converter 102, and switch controller 204 is similar to switch controller 104. First LED string 218 may be similar to first LED string 118 and second LED string 220 may be similar to second LED string 120. Switches 208 and 210 may be similar to switches 108 and 110, and may operate in a complimentary fashion, ensuring that both LED strings (208 and 210) are not on at the same time. Switches 208 and 210 may be used to select different strings of LEDs at different times, and in some cases, switches 208 and 210 may be controlled to define duty cycles of first LED string 218 and second LED string 220 in order to more effectively control the power that is delivered to the different LED strings.

The LED circuit shown in FIG. 2 may achieve more precise current sensing relative to the LED circuit shown in FIG. 1 due to the presence of two different current sense resistors 206 and 207. In this case, the resistances of resistors 206 and 207 can be chosen or selected in the circuit design process in order to provide better precision in current sensing measurements at different current levels. When current flows through first LED string 218, DC/DC converter 202 can determine the amount of current by measuring current through first current sense resistor 206 based on the voltage drop from node 212 to node 214. Nodes 212 and 214 may define external pins that provide electrical connects of the nodes back to DC/DC converter 202. When current flows through second LED string 220, DC/DC converter 202 can determine the amount of current by measuring current through second current sense resistor 207 based on the voltage drop from node 214 to node 216 or by measuring current through first current sense resistor 206 and second current sense resistor 207 based on the voltage drop from node 212 to node 216. Nodes 212, 214 and 216 all define external pins that provide electrical connects of the nodes back to DC/DC converter 202. In any case, based on the resistance of resistors 206 and 207 and the voltage drop between different nodes of the circuit, DC/DC converter 202 can determine, based on Ohm's law, the current flow through first LED string 218 and the current flow through second LED string 220.

Again, the LED circuit shown in FIG. 2 may achieve more precise current sensing relative to the LED circuit shown in FIG. 1 due to the presence of two different current sense resistors 206 and 207. In this case, the resistances of resistors 206 and 207 can be chosen or selected in the circuit design process to provide better precision in current sensing measurements at different current levels. Unfortunately, the LED circuit shown in FIG. 2 uses three external pins associated with nodes 212, 214 and 216, which is greater than the two pins used in the LED circuit of FIG. 1. The additional pin, which provides an additional electrical connection for current sensing purposes, however, is undesirable and adds cost and complexity to the circuit design.

Figure 3:
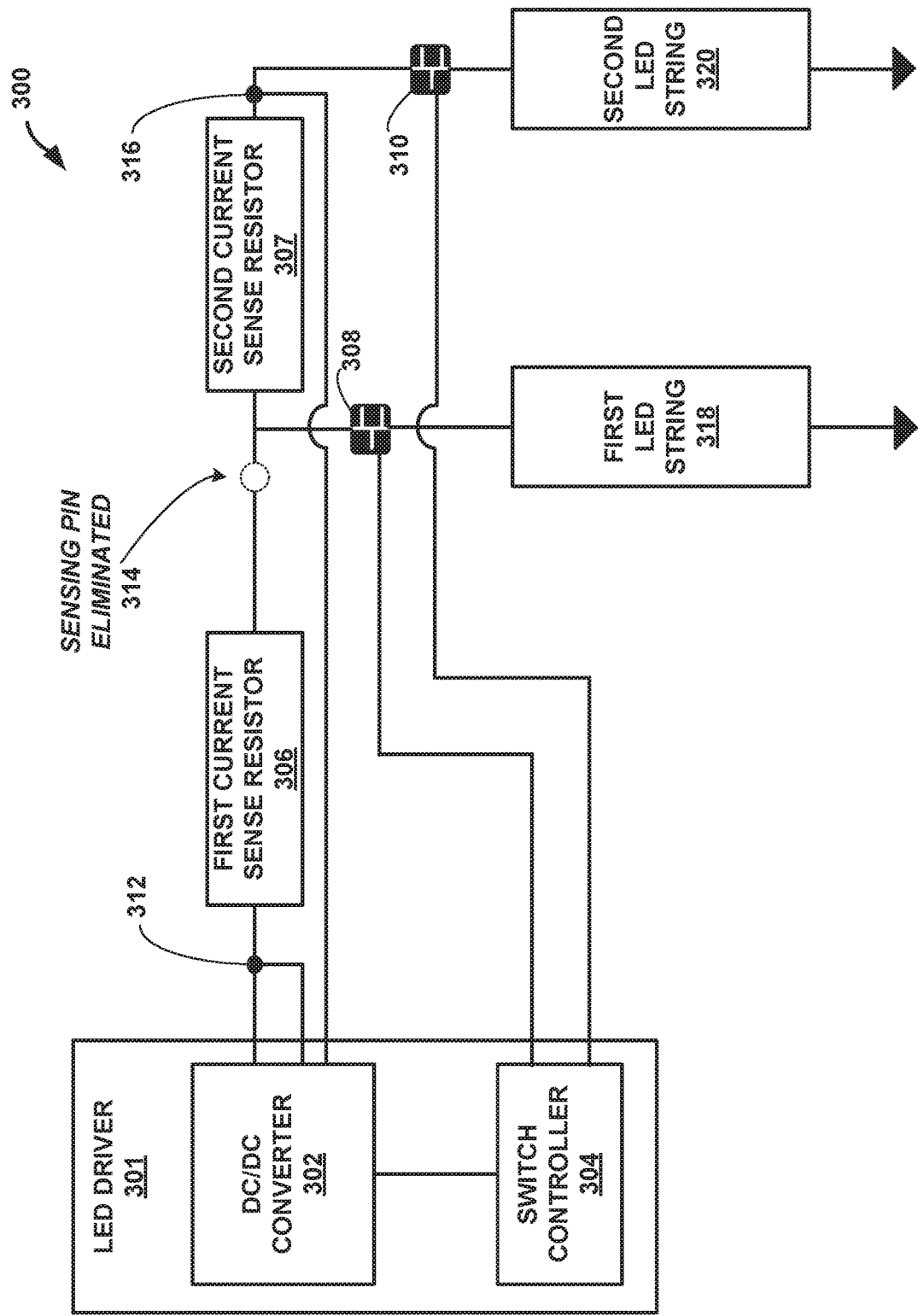
FIG. 3 is another block diagram illustrating an example LED circuit that can control and monitor current through two different complimentary LED strings.

FIG. 3 is another block diagram illustrating another example LED circuit that can control and monitor current through two different complimentary LED strings. LED system 300 of FIG. 3 is similar to LED system 100 and LED system 200 in some respects. Like LED system 200 of FIG. 2, LED system 300 of FIG. 3 makes use of two sensing resistors, which can help to improve current sensing accuracy relative to LED system 100 of FIG. 1. In addition, LED system 300 of FIG. 3 achieves a desirable two pin configuration for current sensing of both LED chains, which avoids the need for the three electrical pins used by system 200 of FIG. 2 (corresponding to nodes 212, 214 and 216).

LED driver 301 may be similar to LED driver 101 and LED driver 201. DC/DC converter 302 is similar to DC/DC converter 102, and switch controller 304 is similar to switch controller 104. First LED string 318 may be similar to first LED string 118 and second LED string 320 may be similar to second LED string 120. Switches 308 and 310 may be similar to switches 108 and 110, and may operate in a complimentary fashion, ensuring that both LED strings (308 and 310) are never on at the same time. Switches 308 and 310 may be used to select different strings of LEDs at different times, and in some cases, switches 308 and 310 may be controlled to define duty cycles of first LED string 318 and second LED string 320 in order to more effectively control the power that is delivered to the different LED strings.

The LED circuit shown in FIG. 3 may achieve more precise current sensing relative to the LED circuit shown in FIG. 1 due to the presence of two different current sense resistors 306 and 307. In this case, the resistances of resistors 306 and 307 can be chosen to provide better precision in current sensing measurements at different current levels. Nodes 312 and 316 may define external pins that provide electrical connects of the nodes back to DC/DC converter 302. When current flows through first LED string 318, DC/DC converter 302 can determine the amount of current by measuring current through first current sense resistor 306 based on the voltage drop from node 312 to node 316. When current flows through second LED string 320, DC/DC converter 302 can determine the amount of current by measuring current through first current sense resistor 306 and second current sense resistor 307 based on the voltage drop from node 312 to node 316. Based on the resistance of resistors 306 and 307 and the voltage drop between different nodes of the circuit, DC/DC converter 302 can determine the current flow through first LED string 318 and can determine the current flow through second LED string 320 based on Ohm's law using two different resistance values (that of resistor 306 and that of the combination of resistors 306 and 307). As illustrated in FIG. 3 the need for an additional sensing pin at node 314 is eliminated entirely, relative to the circuit design shown in FIG. 2.

Current sensing resistors 306 and 307 may be referred to as "shunt" resistors. In some cases, current sensing resistors 306 and 307 are discrete components, although integrated resistors may be used in other examples. Typical voltage sensing levels on the sensing pins may be in the range of approximately 100 mV to 150 mV for the nominal current (e.g. 100% of analog dimming). In this case, in order to provide approximately 1.5 A of current through first LED string 318 (e.g., which may be a typical "high level" current for an LED front light HB and LB), current sensing resistor 306 may define a resistance on the order of approximately 100 mohm. If both current sensing resistor 305 and 306 define resistances on the order of approximately 100 mohm, then the total resistance would be 200 mohm when current flows through second LED string 320, in which case, the current range may be reduced from 1.5 A down to 750 mA (which is a typical "medium level" current for daytime running lights (DRL) of a vehicle.

FIG. 3 illustrates one example of a circuit configured to monitor current through two or more strings of light emitting diodes 318 and 320. According to this disclosure, the circuit may comprise a power converter, such as DC/DC converter 302, and a first current sensing resistor 306, wherein the first current sensing resistor 306 is positioned between a first node 312 and a second node 314 of the circuit. The circuit also includes a second current sensing resistor 307 connected in series with first current sensing resistor 306, wherein the second current sensing resistor 307 is positioned between the second node 314 and a third node 316 of the circuit. Nodes 312 and 316 provide direct electrical connectors to DC/DC converter 302, but node 314 does not include any direct electrical connections to DC/DC converter. Thus, the circuit includes a first electrical contact element at the first node 312 and a second electrical contact element at the third node 316, wherein the first electrical contact element and the second electrical contact element are coupled to the power converter (e.g., DC/DC converter 302). In FIG. 3, current from DC/DC converter 302 flows through first LED string 318 and second LED 320 string in a complimentary fashion such that when current flows through first LED string 318, approximately zero current flows through the second LED string. Approximately zero current flow may refer to situations of zero current flow and situations of very minor current flow due to imperfections or current leakage. Similarly, when current flows through the second LED string 320, approximately zero current flows through the first LED string 318. In some examples, approximately zero current flow may refer to current flow that is less than 5% of a nominal amount of current used to drive a given LED string. A voltage drop between the first electrical contact element at node 312 and the second electrical contact element at node 316 is defined by the first current sensing resistor 306 when current flows through first LED string 318. However, the voltage drop between the first electrical contact element at node 312 and the second electrical contact element at node 316 is defined by both the first current sensing resistor 306 and the second current sensing resistor 307 when current flows through second LED string 320. Again, by providing different levels of resistance for measuring two different current levels to two different loads, improved current sensing accuracy can be achieved, e.g., relative to a single resistor design like that of FIG. 1. At the same time, the configuration of FIG. 3 achieves a two-pin solution that avoids a third electrical pin used by the system of FIG. 2, while still achieving accurate current sensing of both current levels.

The circuit shown in FIG. 3 may include a first controllable switch 308 that selectively couples the first LED string 318 to DC/DC converter 302. The circuit shown in FIG. 3 may also include a second controllable switch 310 that selectively couples the second LED string 320 to DC/DC converter 302. Switch controller 304 is coupled to DC/DC converter 302, and switch controller 304 controls operation of switches 308 and 310 in the complimentary fashion such that when first controllable switch 308 is controlled to be in an on state, the second controllable switch 310 is controlled to be in an off state, and when the first controllable switch 308 is controlled to be in the off state, the second controllable switch 310 is controlled to be in the on state. Switch controller 304 may also account for rise time or other circuit delay in order to ensure that current flow is complimentary and to ensure that substantial current does not flow simultaneously through both switches 308 and 310 and through both LED strings 318 and 320.

As examples, each of switches 308 and 310 may comprise a Field Effect Transistor (FET), a bipolar junction transistor (BJT), a gallium nitride (GaN) switch, or possibly a silicon controlled rectifier (SCR). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same.

In the example of FIG. 3, switches 308 and 310 are positioned on a high side of the LED strings. More specifically, first controllable switch 308 is positioned on a high side of first LED string 318 between the second node 314 of the circuit and the first LED string 318, and the second controllable switch 310 is positioned on a high side of second LED string 320 between the third node 316 of the circuit and second LED string 320. In other examples, however, switches 308 and 310 could be positioned on the low side. Also, although resistors 306 and 307 are illustrated as being positioned on the high side of the LED strings, the current sensing resistors could also be located on the low side.

Figure 4:
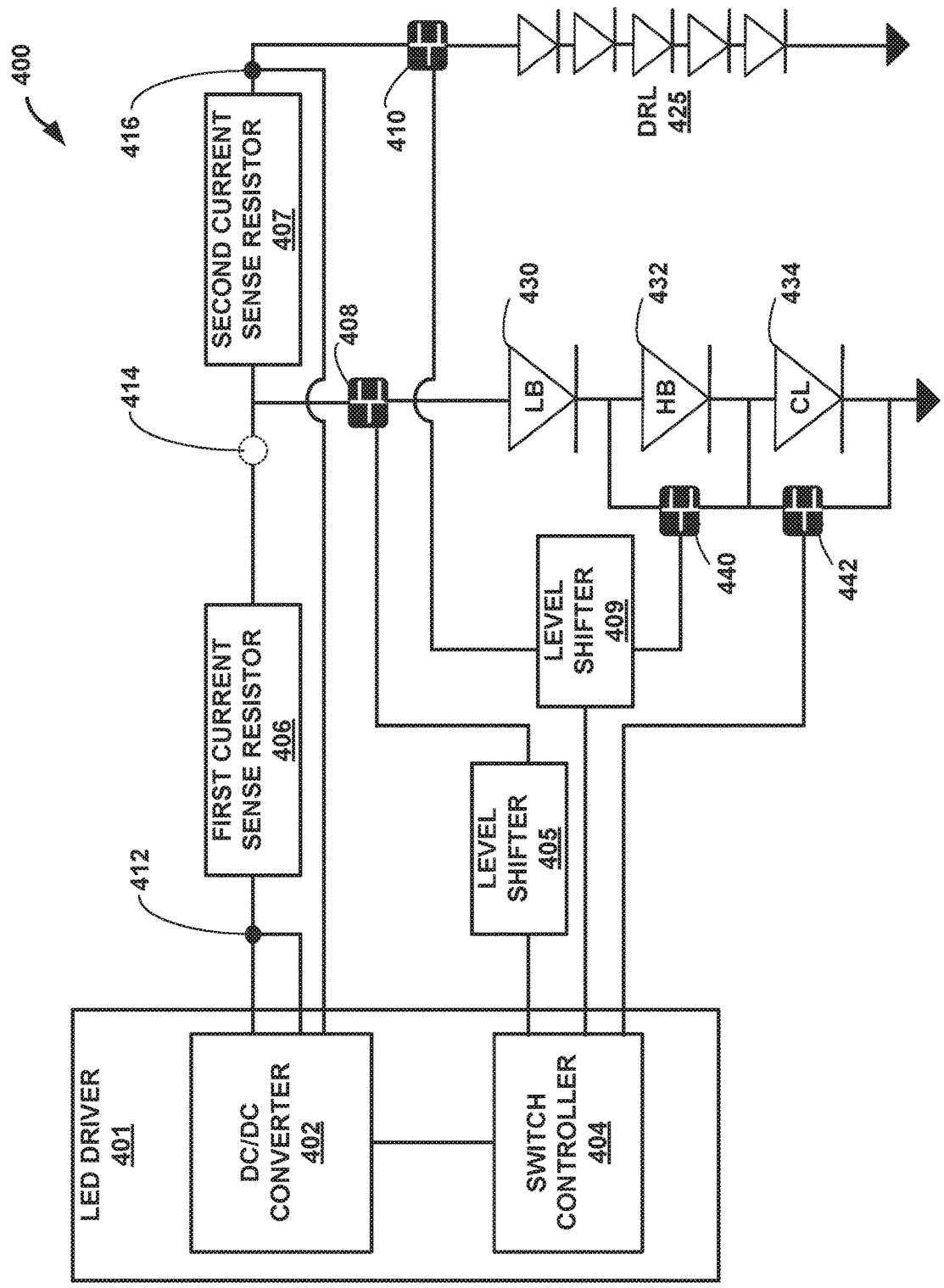
FIG. 4 is another block diagram illustrating an example LED circuit that can control and monitor current through several different complimentary LED strings.

FIG. 4 is another block diagram illustrating another example LED circuit that can control and monitor current through two different complimentary LED strings. LED system 400 of FIG. 4 is very similar to LED system 300 of FIG. 3. FIG. 4 is a more specific example than that of FIG. 3. Like LED system 300 of FIG. 3, LED system 400 of FIG. 4 makes use of two sensing resistors, which can help to improve current sensing accuracy relative to LED system 100 of FIG. 1. In addition, LED system 400 of FIG. 3 achieves a desirable two pin configuration for current sensing of both LED chains, which avoids the need for the three electrical pins used by system 200 of FIG. 2 (corresponding to nodes 212, 214 and 216).

LED driver 401 may be similar to LED driver 301. DC/DC converter 402 is similar to DC/DC converter 302, and switch controller 404 is somewhat similar to switch controller 304, although switch controller 404 controls more switches than switch controller 304.

Switches 408 and 410 may be similar to switches 308 and 310, and may operate in a complimentary fashion, ensuring that both LED strings (308 and 310) are never on at the same time. Switches 408 and 410 may be used to select different strings of LEDs at different times, and in some cases, switches 408 and 410 may be controlled to define duty cycles of the LED strings in order to more effectively control the power that is delivered to the different LED strings.

In FIG. 4, a first LED string is illustrated as a string of low beams 430, high beams 432 and corner lighting 434, which may be used as part of a vehicle lighting system. A second LED string is illustrated as a string of daytime running lights (DRLs) 425. In order to control and select different lights from the first string of LEDs, the circuit shown in FIG. 4 includes additional switches 440 and 442, which can selectively couple a subset of LEDs within the first LED string to DC/DC converter 402. For example, switch controller 404 may control switches 440 and 442 based on input from a user, e.g. selecting among low beams 430, high beams 432 and corner lighting. In low beam configuration, LB 430 may be driven to emit light, whereas in high beam configuration, LB 430 and HB 432 may be driven to emit light. In corner lighting in a low beam setting, LB 430 and CL 434 driven to emit light, and in corner lighting in a high beam setting, LB 430, HB 432, and CL 434 are all driven to emit light. Switch controller 404 can selectively activate switches 440 and 442 to implement these lighting settings of the first LED string. In some cases, level shifters 405 and 409 may be used to adjust the level of control signals provided to different switches.

FIG. 4 represents another example of system comprising two different strings of LEDs and a circuit configured to monitor current through the two different strings of LEDs with the accuracy associated with a two resistor approach (like that of FIG. 2) while using only two pins for the current sensing (rather than the three pins used in the system of FIG. 2). According to this disclosure, a circuit may comprise a power converter, such as DC/DC converter 402, and a first current sensing resistor 406, wherein the first current sensing resistor 406 is positioned between a first node 412 and a second node 414 of the circuit. The circuit also includes a second current sensing resistor 407 connected in series with first current sensing resistor 406, wherein the second current sensing resistor 407 is positioned between the second node 414 and a third node 416 of the circuit. Nodes 412 and 416 provide direct electrical connectors to DC/DC converter 402, but node 414 does not include any direct electrical connections to DC/DC converter. Thus, the circuit includes a first electrical contact element at the first node 412 and a second electrical contact element at the third node 416, wherein the first electrical contact element and the second electrical contact element are coupled to the power converter (e.g., DC/DC converter 402). In FIG. 4, current from DC/DC converter 402 flows through one or more of LB 430, HB 432 and CL 434, and flow through DLR 425 in a complimentary fashion such that when current flows through one or more LB 430, HB 432 and CL 434, approximately zero current flows through DLR 425, and vice versa. Again, approximately zero current flow may refer to situations of zero current flow and situations of very minor current flow due to imperfections or current leakage.

A voltage drop between the first electrical contact element at node 412 and the second electrical contact element at node 416 is defined by the first current sensing resistor 406 when current flows through one or more LB 430, HB 432 and CL 434. However, the voltage drop between the first electrical contact element at node 412 and the second electrical contact element at node 416 is defined by both the first current sensing resistor 406 and the second current sensing resistor 407 when current flows through DLR 425. Again, by providing different levels of resistance for measuring two different current levels to two different loads, improved current sensing accuracy can be achieved, e.g., relative to a single resistor design like that of FIG. 1. At the same time, the configuration of FIG. 4 achieves a two-pin solution that avoids a third electrical pin used by the system of FIG. 2, while still achieving accurate current sensing of both current levels.

Figure 5:
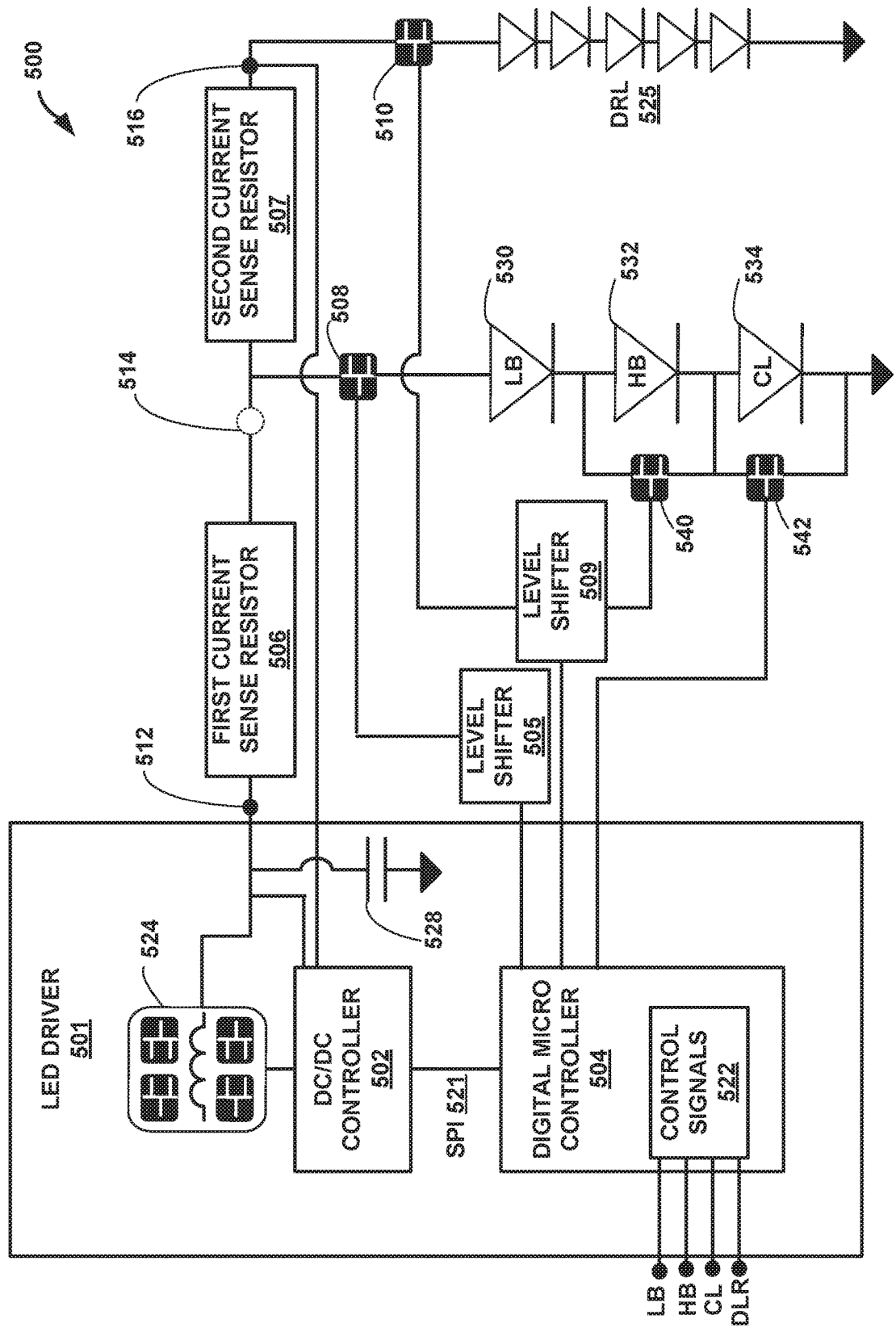
FIG. 5 is another block diagram illustrating an example LED circuit that can control and monitor current through several different complimentary LED strings.

FIG. 5 is a block diagram illustrating another example LED circuit that can control and monitor current through two different complimentary LED strings. More specifically, FIG. 5 depicts an LED driver 501 along with circuit elements that allow for precise current monitoring of the two different LED strings in a two pin current monitoring configuration. LED driver 501 may comprise an inductor circuit 524 comprising an inductor positioned in an H-bridge of switch elements. DC/DC controller 502 controls two or more of the switches within the H-bridge of inductor circuit 524 in order to charge or discharge energy between the inductor of inductor circuit 524 and capacitor 528. Elements 524, 528 and 502 represent one example of a DC/DC power converter consistent with this disclosure, although other types of power converters could also be used.

In FIG. 4, a first LED string is illustrated as a string of low beams 530, high beams 532 and corner lighting 534, which may be used for vehicle lighting. A second LED string is illustrated as a string of daytime running lights (DRLs) 525, which may also be part of a vehicle lighting system. In order to control and select different lights from the first string of LEDs, the circuit shown in FIG. 5 includes additional switches 540 and 542, which can selectively couple a subset of LEDs within the first LED string to the DC/DC converter (e.g. inductors circuit 524, capacitor 528 and DC/DC controller 502). Digital micro controller 504 may control switches 508, 510, 540 and 542 based on control signals 524 from a user, e.g. input signals from a user selecting low beams 530, high beams 532, corner lighting 534, and/or daytime running lights 525. In low beam configuration, LB 530 may be driven to emit light, whereas in high beam configuration, LB 530 and HB 532 may be driven to emit light. In corner lighting in a low beam setting, LB 530 and CL 534 driven to emit light, and in corner lighting in a high beam setting, LB 550, HB 532, and CL 534 are all driven to emit light. Digital micro controller 504 can selectively activate switches 540 and 542 to implement these lighting settings of the first LED string. In some cases, level shifters 505 and 509 may be used to adjust the level of control signals provided to some of the different switches. Digital micro controller 504 may communicate with DC/DC controller 502 via a digital interface 521, which may comprise a serial peripheral interface (SPI).

In some examples, such as for motorcycle lighting, the first LED string (defined by LB 530, HB 532, and CL 534) may be used in a first driving mode and the second LED string (defined by DRL 525) may be used in a second driving mode, in which case the first driving mode may comprise a night time mode and the second driving mode may comprise a daytime driving mode. In this type of example DRL 525 are not active in night time mode. However, it may be desirable for DRL 525 to be used along with LB 530, HB 532 and CR 534 in night mode. DRL 525, for example, may provide aesthetics that improve the look of vehicle lights in both daytime and nighttime mode. In this case, the duty cycles of switches 508 and 510 can be defined to provide on-off switching of the first and second LED strings in a complimentary fashion such that both LED strings appear active in night mode. The On-Off switching of LEDs may occur at a frequency that is much higher than the resolution of human vision, and thus, the lighting may appear to be continuous even though the lights are switching on and off at high frequency. In some cases, the duty cycles of switches 508 and 510 can be defined or adjusted so as to adjust the light intensity of the first and second LED strings.

According to this disclosure, the circuit configuration shown in FIG. 5 allows DC/DC controller 502 to control and monitor current through two different complimentary LED strings. Switches 508 and 510 may operate in a complimentary fashion, ensuring that both LED strings (the first string of one or more of LB 530, HB 532 and CL 534 and the second string of DRL 525) are never driven with current at the same time. Switches 508 and 510 may be used to select different strings of LEDs at different times, and in some cases, switches 508 and 510 may be controlled to define duty cycles of first LED string (one or more of LB 530, HB 532 and CL 534) and second LED string (DRL 525) in order to more effectively control the power that is delivered to the different LED strings.

The LED circuit shown in FIG. 5 may achieve more precise current sensing relative to the LED circuit shown in FIG. 1 due to the presence of two different current sense resistors 506 and 507. The resistances of resistors 506 and 507 can be chosen or selected in the circuit design process in order to provide better precision in current sensing measurements at different current levels. When current flows through first LED string (one or more of LB 530, HB 532 and CL 534) DC/DC controller 502 can determine the amount of current by measuring current through first current sense resistor 506 based on the voltage drop from node 512 to node 516. Nodes 512 and 516 may define external pins that provide electrical connects of the nodes back to DC/DC controller 502. When current flows through second LED string (DRL 525), DC/DC controller 502 can determine the amount of current by measuring current through first current sense resistor 506 and second current sense resistor 507 based on the voltage drop from node 512 to node 516

In FIG. 5, current from LED driver 501 flows through first LED string (one or more of LB 530, HB 532 and CL 534) and second LED (DRL 525) string in a complimentary fashion such that when current flows through first LED string, approximately zero current flows through the second LED string. Approximately zero current flow may refer to situations of zero current flow and situations of very minor current flow due to imperfections or current leakage. Similarly, when current flows through the second LED string (DRL 525), approximately zero current flows through the first LED string (one or more of LB 530, HB 532 and CL 534). A voltage drop between the first electrical contact element at node 512 and the second electrical contact element at node 516 is defined by the first current sensing resistor 506 when current flows through first LED string (one or more of LB 530, HB 532 and CL 534). However, the voltage drop between the first electrical contact element at node 512 and the second electrical contact element at node 516 is defined by both the first current sensing resistor 506 and the second current sensing resistor 507 when current flows through second LED string (DRL 525). Again, by providing different levels of resistance for measuring two different current levels to two different loads, improved current sensing accuracy can be achieved, e.g., relative to a single resistor design like that of FIG. 1. At the same time, the configuration of FIG. 5 achieves a two-pin solution that avoids a third electrical pin used by the system of FIG. 2, while still achieving accurate current sensing of both current levels delivered to the two different LED strings.

Figure 6:
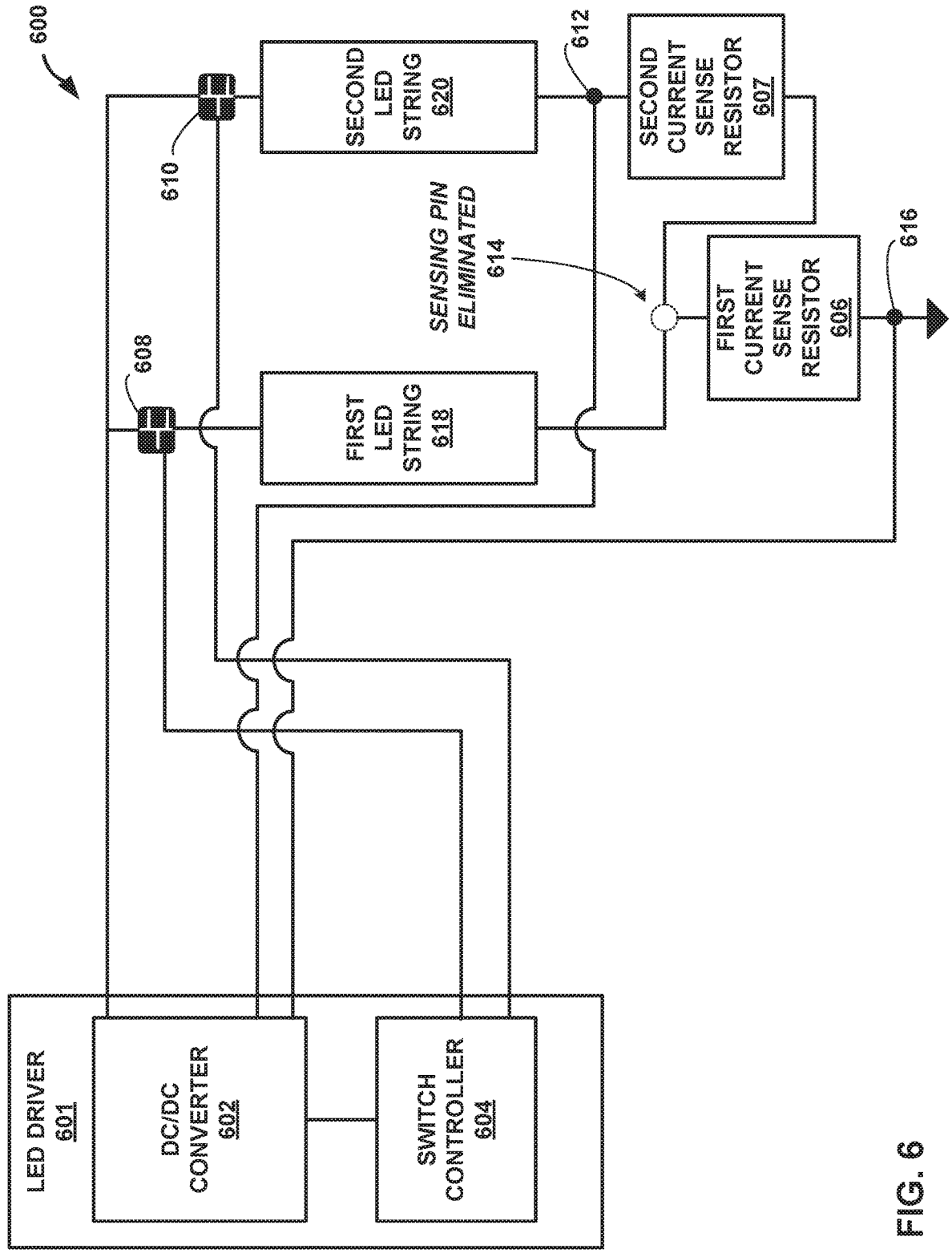
FIG. 6 is another block diagram illustrating an example LED circuit that can control and monitor current through several different complimentary LED strings.

FIG. 6 is yet another example LED circuit that can control and monitor current through two different complimentary LED strings. LED system 600 of FIG. 6 is similar to LED system 300 of FIG. 3 in some respects. Like LED system 300 of FIG. 3, LED system 600 of FIG. 6 makes use of two sensing resistors, which can help to improve current sensing accuracy relative to LED system 100 of FIG. 1. In addition, LED system 600 of FIG. 3 achieves a desirable two pin configuration for current sensing of both LED chains, which avoids the need for the three electrical pins used by system 200 of FIG. 2 (corresponding to nodes 212, 214 and 216).

LED driver 601 may be similar to LED driver 301. DC/DC converter 602 is similar to DC/DC converter 302, and switch controller 604 is similar to switch controller 304.

Switches 608 and 610 may be similar to switches 308 and 310, and may operate in a complimentary fashion, ensuring that both LED strings (308 and 310) are never receiving substantial current on at the same time. Switches 608 and 610 may be used to select different strings of LEDs at different times, and in some cases, switches 608 and 610 may be controlled to define duty cycles of the LED strings in order to more effectively control the power that is delivered to the different LED strings.

FIG. 6 illustrates another example of a circuit configured to monitor current through two or more strings of LEDs 618 and 620. In contrast to FIG. 3, however, which implements current sensing resistors on a high side of LED strings 318 and 320, in FIG. 6, the current sensing resistors 606 and 607 are positioned on a low side of LED strings 618 and 620. In particular, a first current sensing resistor 606 is positioned on a low side of first LED string 618 between the first LED string 618 and a ground node, and a second current sensing resistor 607 is positioned on a low side of second LED string 620 between the second LED string 620 and first LED string 618.

According to this disclosure, the circuit may comprise a power converter, such as DC/DC converter 602, and a first current sensing resistor 606, wherein the first current sensing resistor 606 is positioned between a first node 616 and a second node 614 of the circuit. The circuit also includes a second current sensing resistor 607 connected in series with first current sensing resistor 606, wherein the second current sensing resistor 607 is positioned between the second node 614 and a third node 612 of the circuit. Nodes 612 and 616 provide direct electrical connectors to DC/DC converter 602, but node 614 does not include any direct electrical connections to DC/DC converter. Thus, the circuit includes a first electrical contact element at the first node 616 and a second electrical contact element at the third node 612, wherein the first electrical contact element and the second electrical contact element are coupled to the power converter (e.g., DC/DC converter 602). In FIG. 6, current from DC/DC converter 602 flows through first LED string 618 and second LED 620 string in a complimentary fashion such that when current flows through first LED string 618, approximately zero current flows through second LED string 620. Again, approximately zero current flow may refer to situations of zero current flow and situations of very minor current flow due to imperfections or current leakage. Similarly, when current flows through the second LED string 620, approximately zero current flows through the first LED string 618.

A voltage drop between the first electrical contact element at node 616 and the second electrical contact element at node 612 is defined by the first current sensing resistor 606 when current flows through first LED string 618. However, the voltage drop between the first electrical contact element at node 616 and the second electrical contact element at node 612 is defined by both the first current sensing resistor 606 and the second current sensing resistor 607 when current flows through second LED string 620. Again, by providing different levels of resistance for measuring two different current levels to two different loads, improved current sensing accuracy can be achieved, e.g., relative to a single resistor design like that of FIG. 1. At the same time, the configuration of FIG. 6 achieves a two-pin solution that avoids a third electrical pin used by the system of FIG. 2, while still achieving accurate current sensing of both current levels. In some examples, it may be more desirable to provide the current sense resistors on the low side (as shown in FIG. 6), while in other examples it may be more desirable to implement the current sense resistor on the high side (as shown in FIG. 3).

Figure 7:
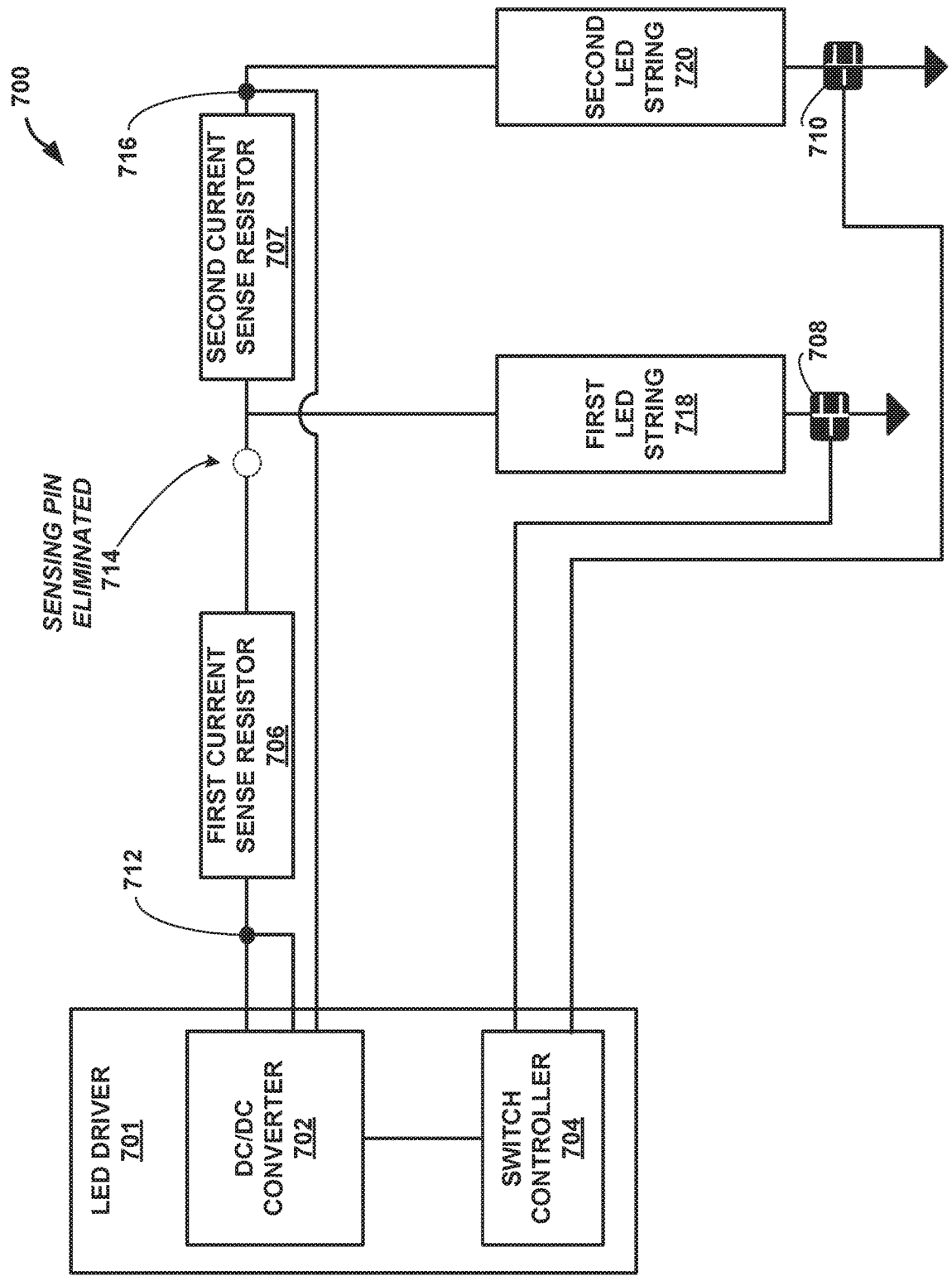
FIG. 7 is another block diagram illustrating an example LED circuit that can control and monitor current through several different complimentary LED strings.

FIG. 7 is yet another example LED circuit that can control and monitor current through two different complimentary LED strings. LED system 700 of FIG. 7 is very similar to LED system 300 of FIG. 3. Like LED system 300 of FIG. 3, LED system 700 of FIG. 7 makes use of two sensing resistors, which can help to improve current sensing accuracy relative to LED system 100 of FIG. 1. In addition, LED system 700 of FIG. 7 achieves a desirable two pin configuration for current sensing of both LED chains, which avoids the need for the three electrical pins used by system 200 of FIG. 2 (corresponding to nodes 212, 214 and 216).

LED driver 701 may be similar to LED driver 301. DC/DC converter 702 is similar to DC/DC converter 302, and switch controller 704 is similar to switch controller 304. Current sense resistors 706 and 707 may be similar to current sense resistors 306 and 307.

Switches 708 and 710 may be similar to switches 308 and 310, and may operate in a complimentary fashion, ensuring that both LED strings (308 and 310) are never receiving substantial current on at the same time. Switches 708 and 710 may be used to select different strings of LEDs at different times, and in some cases, switches 708 and 710 may be controlled to define duty cycles of the LED strings in order to more effectively control the power that is delivered to the different LED strings.

According to FIG. 7, switches 708 and 709 are positioned on a low side of the LED strings. In contrast, in the circuit configuration of FIG. 3, switches 308 and 309 are positioned on the high side of the LED strings. In particular, according to FIG. 7, a first controllable switch 708 is positioned on a low side of the first LED string 718 between the first LED string and a ground node, and a second controllable switch 709 is positioned on a low side of second LED string 720 between second LED string 720 and the ground node. In some examples, it may be more desirable to provide the controllable switches on the low side (as shown in FIG. 7), while in other examples it may be more desirable to implement the controllable switches on the high side (as shown in FIG. 3).

Figure 8:
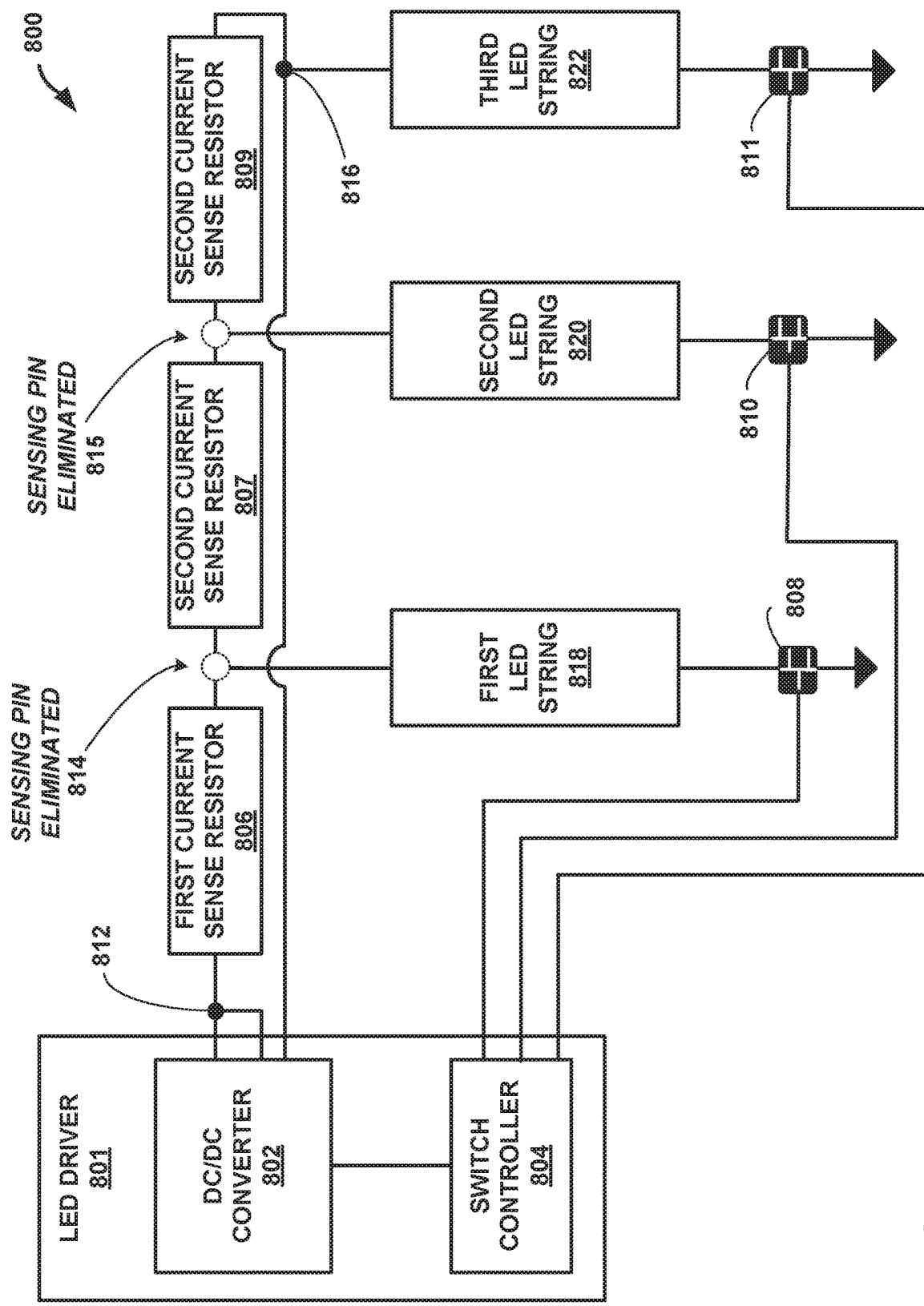
FIG. 8 is a block diagram illustrating an example LED circuit that can control and monitor current through three different complimentary LED strings.

The techniques descried herein may be used for current monitoring of two different LED strings, but the techniques may be extended to achieve precise current monitoring of three or more LED strings (e.g., using three or more current sense resistors and a two pin sensing configuration). FIG. 8 is example LED circuit that can control and monitor current through three different complimentary LED strings, but the techniques may be extended for control and monitoring of even more LED strings. FIG. 8 is similar to FIG. 3 in many respects, but FIG. 8 includes three sensing resistors, three LED strings, and three controllable switches for controlling the three LED strings in a complimentary fashion.

Like LED system 300 of FIG. 3, LED system 800 of FIG. 8 makes use of a plurality of sensing resistors, which can help to improve current sensing accuracy relative to LED system 100 of FIG. 1. In addition, LED system 800 of FIG. 8 achieves a desirable two pin configuration for current sensing of both LED chains, which avoids the need for the three electrical pins used by system 200 of FIG. 2 (corresponding to nodes 212, 214 and 216).

LED driver 801 may be similar to LED driver 301. DC/DC converter 802 is similar to DC/DC converter 302, and switch controller 804 is similar to switch controller 304. Current sense resistors 806 and 807 may be similar to current sense resistors 306 and 307. In addition, system 800 includes a third sensing resistor 809.

Switches 808 and 810 may be similar to switches 308 and 310, and system 800 includes a third controllable switch 811. Although illustrated on the low side of LED strings 818, 820 and 822 in FIG. 8, switches 808, 810 and 811 could alternatively be positioned on the high side of LED strings 818, 820 and 822.

Switches 808, 810 and 811 may be controlled by switch controller 804 in a complimentary fashion, ensuring that any two LED strings of the plurality of LED strings (818, 820 and 822) are never receiving substantial current on at the same time. Switches 808, 810 and 811 may be used to select different strings of LEDs at different times, and in some cases, switches 808, 810 and 811 may be controlled to define duty cycles of the LED strings in order to more effectively control the power that is delivered to the different LED strings.

According to FIG. 8, third current sensing resistor 809 is connected in series with second current sensing resistor 807, wherein the third current sensing resistor 809 is positioned between the second current sensing resistor 807 and the third node 815 of the circuit. Current from the power converter (e.g., DC/DC converter 802) flows through the first LED string 818, the second LED string 820, and the third LED string 822 in a complimentary fashion, such that when current flows through the first LED string 818, approximately zero current flows through the second LED string 820 or the third LED string 822, when current flows through the second LED string 820 approximately zero current flows through the first LED string 818 or the third LED string 822, and when current flows through the third LED string 822 approximately zero current flows through the first LED string 818 or the second LED string 820. The voltage drop between the first electrical contact element at node 812 and the second electrical contact element at node 816 is defined by the first current sensing resistor 806, the second current sensing resistor 807, and the third current sensing resistor 809 when current flows through the third LED string 822.

Figure 9:
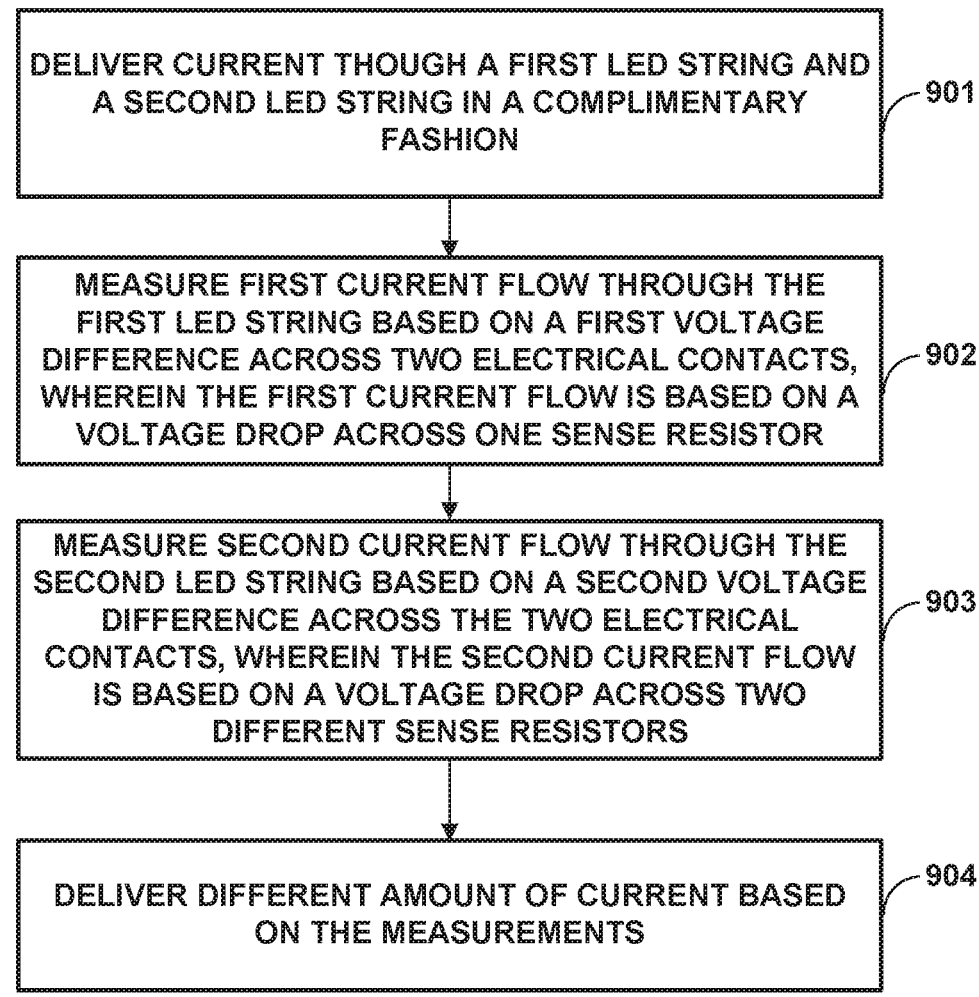
FIG. 9 is a flow diagram consistent with techniques performed by an LED circuit configured to monitor current through two or more strings of LEDs

FIG. 9 is a flow consistent with techniques performed by an LED circuit configured to monitor current through two or more strings of LEDs. FIG. 9 will be described from the perspective of system 300 of FIG. 3, although other systems and circuits could perform the techniques. As shown in FIG. 9, LED driver 301 delivers current though a first LED string and a second LED string 320 in a complimentary fashion (901). In particular, switch controller 304 may control switches 308 and 310 to ensure that when switch 308 is opened to cause current flow through first LED string 318, switch 310 is controlled to be closed to cause approximately zero current to flow through second LED string 320. And when switch 310 is opened to cause current flow through first LED string 320, switch 308 is controlled to be closed to cause approximately zero current to flow through second LED string 318. Of course, the circuit may account for current rise time and responsiveness of the switches, and some small amounts of leakage current may still flow when switches are closed.

DC/DC converter 302 measures first current flow through the first LED string 318 based on a first voltage difference across two electrical contacts at nodes 312 and 316, which is based on a voltage drop across one current sense resistor (e.g., first current sense resistor 306) (902). DC/DC converter 302 also measures second current flow through the second LED string 3320 based on a second voltage difference across two electrical contacts at nodes 312 and 316, which is based on a voltage drop across two different current sense resistors (e.g., first current sense resistor 306 and second current sense resistor 308) (903). DC/DC converter 302 may include a DC/DC controller (not shown in FIG. 3), which performs these different current sensing measurements. Based on the measurements, DC/DC converter 302 may be configured to deliver a different amount of current (904), e.g., to more properly drive the LED strings with the desired levels of current.

The following examples may illustrate one or more aspects of the disclosure.

Example 1

A circuit configured to monitor current through two or more strings of light emitting diodes, the circuit comprising: a power converter; a first current sensing resistor, wherein the first current sensing resistor is positioned between a first node and a second node of the circuit; a second current sensing resistor connected in series with the first current sensing resistor, wherein the second current sensing resistor is positioned between the second node and a third node of the circuit; and a first electrical contact element at the first node and a second electrical contact element at the third node, wherein the first electrical contact element and the second electrical contact element are coupled to the power converter; wherein current from the power converter flows through a first LED string and a second LED string in a complimentary fashion such that when current flows through the first LED string approximately zero current flows through the second LED string, and when current flows through the second LED string approximately zero current flows through the first LED string, wherein a voltage drop between the first electrical contact element and the second electrical contact element is defined by the first current sensing resistor when current flows through the first LED string, and wherein the voltage drop between the first electrical contact element and the second electrical contact element is defined by the first current sensing resistor and the second current sensing resistor when current flows through the second LED string.

Example 2

The circuit of example 1, further comprising: a first controllable switch, wherein the first controllable switch selectively couples the first LED string to the power converter; and a second controllable switch, wherein the second controllable switch selectively couples the second LED string to the power converter.

Example 3

The circuit of example 1 or 2, wherein the first controllable switch is positioned on a high side of the first LED string between the second node of the circuit and the first LED string; and wherein the second controllable switch is positioned on a high side of the second LED string between the third node of the circuit and the second LED string.

Example 4

The circuit of example 1 or 2, wherein the first controllable switch is positioned on a low side of the first LED string between the first LED string and a ground node, and wherein the second controllable switch is positioned on a low side of the second LED string between second LED string and the ground node.

Example 5

The circuit of any of examples 1-4, wherein the first controllable switch and the second controllable switch are controlled in a complimentary fashion such that when the first controllable switch is controlled to be in an on state, the second controllable switch is controlled to be in an off state, and when the first controllable switch is controlled to be in the off state, the second controllable switch is controlled to be in the on state.

Example 6

The circuit of any of examples 1-5, further comprising a switch controller configured to control the first controllable switch and the second controllable switch, wherein the switch controller is coupled to the power converter.

Example 7

The circuit of any of examples 1-6, further comprising: one or more additional switches configured to selectively couple a subset of LEDs within the first LED string to the power converter.

Example 8

The circuit of any of examples 1-7, wherein the power converter comprises a DC to DC power converter.

Example 9

The circuit of any of examples 1-8, wherein the first sensing resistor is positioned on a high side of the first LED string, and wherein the second sensing resistor is positioned on a high side of the second LED string.

Example 10

The circuit of any of examples 1-8, wherein the first sensing resistor is positioned on a low side of the first LED string between the first LED string and a ground node, and wherein the second sensing resistor is positioned on a low side of the second LED string between the second LED string and the ground node.

Example 11

The circuit of any of examples 1-10, further comprising: a third current sensing resistor connected in series with the second current sensing resistor, wherein the third current sensing resistor is positioned between the second current sensing resistor and the third node of the circuit, wherein current from the power converter flows through the first LED string, the second LED string, and a third LED string in a complimentary fashion, such that when current flows through the first LED string approximately zero current flows through the second LED string or the third LED string, when current flows through the second LED string approximately zero current flows through the first LED string or the third LED string, and when current flows through the third LED string approximately zero current flows through the first LED string or the second LED string, and wherein the voltage drop between the first electrical contact element and the second electrical contact element is defined by the first current sensing resistor, the second current sensing resistor, and the third current sensing resistor when current flows through the third LED string.

Example 12

A system comprising: a first light emitting diode (LED) string; a second LED strong positioned in parallel with the first LED string; and a circuit configured to monitor current through the first LED string and the second LED string, the circuit comprising: a power converter; a first current sensing resistor, wherein the first current sensing resistor is positioned between a first node and a second node of the circuit; a second current sensing resistor connected in series with the first current sensing resistor, wherein the second current sensing resistor is positioned between the second node and a third node of the circuit; and a first electrical contact element at the first node and a second electrical contact element at the third node, wherein the first electrical contact element and the second electrical contact element are coupled to the power converter, wherein current from the power converter flows through the first LED string and the second LED string in a complimentary fashion, such that when current flows through the first LED string approximately zero current flows through the second LED string, and when current flows through the second LED string approximately zero current flows through the first LED string, wherein a voltage drop between the first electrical contact element and the second electrical contact element is defined by the first current sensing resistor when current flows through the first LED string, and wherein the voltage drop between the first electrical contact element and the second electrical contact element is defined by the first current sensing resistor and the second current sensing resistor when current flows through the second LED string.

Example 13

The system of example 12, wherein the system comprises a vehicle lighting system, wherein the first LED string corresponds to vehicle headlights and the second LED string corresponds to daytime running lamp (DRL) lighting of the vehicle.

Example 14

The system of example 12 or 13, wherein the circuit of further comprises: a first controllable switch, wherein the first controllable switch selectively couples the first LED string to the power converter; and a second controllable switch, wherein the second controllable switch selectively couples the second LED string to the power converter.

Example 15

The system of any of examples 12-14, wherein the first controllable switch and the second controllable switch are controlled in a complimentary fashion such that when the first controllable switch is controlled to be in an on state, the second controllable switch is controlled to be in an off state, and when the first controllable switch is controlled to be in the off state, the second controllable switch is controlled to be in the on state.

Example 16

The system of any of examples 12-15, wherein the circuit further comprises a switch controller configured to control the first controllable switch and the second controllable switch, wherein the switch controller is coupled to the power converter.

Example 17

The system of any of examples 12-16, further comprising: one or more additional switches configured to selectively couple a subset of LEDs within the first LED string to the power converter.

Example 18

The system of any of examples 12-17, wherein the system comprises a vehicle lighting system, wherein the first LED string corresponds to vehicle headlights and the second LED string corresponds to daytime running lamp (DRL) lighting of the vehicle, and wherein the one or more additional switches configured to selectively control high beams, low beams, and corner lighting via different light emitting diodes within the first LED string.

Example 19

A method comprising: delivering current through a first light emitting diode (LED) string and a second LED string in a complimentary fashion, such that when current flows through the first LED string approximately zero current flows through the second LED string, and when current flows through the second LED string approximately zero current flows through the first LED string, measuring first current flow through the first LED string based on a first voltage difference between a first electrical contact and a second electrical contact, wherein the first voltage difference is based on a drop across a first current sensing resistor; and measuring second current flow through the second LED string based on a second voltage difference between the first electrical contact and the second electrical contact, wherein the second voltage difference is based on a voltage drop across both the first current sensing resistor and a second current sensing resistor.

Example 20

The method of claim 19, further comprising: delivering a different amount of current through the first LED string based on the measured first current flow; and/or delivering a different amount of current through the second LED string based on the measured second current flow.

Various aspects have been described in this disclosure. These and other aspects are within the scope of the following claims.

The invention claimed is:

1. A circuit configured to monitor current through two or more strings of light emitting diodes, the circuit comprising:
a power converter;
a first current sensing resistor, wherein the first current sensing resistor is positioned between a first node and a second node of the circuit;
a second current sensing resistor connected in series with the first current sensing resistor, wherein the second current sensing resistor is positioned between the second node and a third node of the circuit; and
a first electrical contact element at the first node and a second electrical contact element at the third node, wherein the first electrical contact element and the second electrical contact element are coupled to the power converter,
wherein current from the power converter flows through a first LED string and a second LED string in a complimentary fashion such that when current flows through the first LED string approximately zero current flows through the second LED string, and when current flows through the second LED string approximately zero current flows through the first LED string,
wherein a voltage drop between the first electrical contact element and the second electrical contact element is defined by the first current sensing resistor when current flows through the first LED string, and
wherein the voltage drop between the first electrical contact element and the second electrical contact element is defined by the first current sensing resistor and the second current sensing resistor when current flows through the second LED string.

2. The circuit of claim 1, further comprising:
a first controllable switch, wherein the first controllable switch selectively couples the first LED string to the power converter; and
a second controllable switch, wherein the second controllable switch selectively couples the second LED string to the power converter.

3. The circuit of claim 2,
wherein the first controllable switch is positioned on a high side of the first LED string between the second node of the circuit and the first LED string; and
wherein the second controllable switch is positioned on a high side of the second LED string between the third node of the circuit and the second LED string.

4. The circuit of claim 2,
wherein the first controllable switch is positioned on a low side of the first LED string between the first LED string and a ground node, and
wherein the second controllable switch is positioned on a low side of the second LED string between second LED string and the ground node.

5. The circuit of claim 2, wherein the first controllable switch and the second controllable switch are controlled in a complimentary fashion such that when the first controllable switch is controlled to be in an on state, the second controllable switch is controlled to be in an off state, and when the first controllable switch is controlled to be in the off state, the second controllable switch is controlled to be in the on state.

6. The circuit of claim 5, further comprising a switch controller configured to control the first controllable switch and the second controllable switch, wherein the switch controller is coupled to the power converter.

7. The circuit of claim 2, further comprising:
one or more additional switches configured to selectively couple a subset of LEDs within the first LED string to the power converter.

8. The circuit of claim 1, wherein the power converter comprises a DC to DC power converter.

9. The circuit of claim 1, wherein the first sensing resistor is positioned on a high side of the first LED string, and
wherein the second sensing resistor is positioned on a high side of the second LED string.

10. The circuit of claim 1, wherein the first sensing resistor is positioned on a low side of the first LED string between the first LED string and a ground node, and
wherein the second sensing resistor is positioned on a low side of the second LED string between the second LED string and the ground node.

11. The circuit of claim 1, further comprising:
a third current sensing resistor connected in series with the second current sensing resistor, wherein the third current sensing resistor is positioned between the second current sensing resistor and the third node of the circuit,
wherein current from the power converter flows through the first LED string, the second LED string, and a third LED string in a complimentary fashion, such that when current flows through the first LED string approximately zero current flows through the second LED string or the third LED string, when current flows through the second LED string approximately zero current flows through the first LED string or the third LED string, and when current flows through the third LED string approximately zero current flows through the first LED string or the second LED string, and
wherein the voltage drop between the first electrical contact element and the second electrical contact element is defined by the first current sensing resistor, the second current sensing resistor, and the third current sensing resistor when current flows through the third LED string.

12. A system comprising:
a first light emitting diode (LED) string;
a second LED strong positioned in parallel with the first LED string; and
a circuit configured to monitor current through the first LED string and the second LED string, the circuit comprising:
a power converter;
a first current sensing resistor, wherein the first current sensing resistor is positioned between a first node and a second node of the circuit;
a second current sensing resistor connected in series with the first current sensing resistor, wherein the second current sensing resistor is positioned between the second node and a third node of the circuit; and
a first electrical contact element at the first node and a second electrical contact element at the third node, wherein the first electrical contact element and the second electrical contact element are coupled to the power converter,
wherein current from the power converter flows through the first LED string and the second LED string in a complimentary fashion, such that when current flows through the first LED string approximately zero current flows through the second LED string, and when current flows through the second LED string approximately zero current flows through the first LED string,
wherein a voltage drop between the first electrical contact element and the second electrical contact element is defined by the first current sensing resistor when current flows through the first LED string, and
wherein the voltage drop between the first electrical contact element and the second electrical contact element is defined by the first current sensing resistor and the second current sensing resistor when current flows through the second LED string.

13. The system of claim 12, wherein the system comprises a vehicle lighting system, wherein the first LED string corresponds to vehicle headlights and the second LED string corresponds to daytime running lamp (DRL) lighting of the vehicle.

14. The system of claim 12, wherein the circuit of further comprises:
a first controllable switch, wherein the first controllable switch selectively couples the first LED string to the power converter; and
a second controllable switch, wherein the second controllable switch selectively couples the second LED string to the power converter.

15. The system of claim 14, wherein the first controllable switch and the second controllable switch are controlled in a complimentary fashion such that when the first controllable switch is controlled to be in an on state, the second controllable switch is controlled to be in an off state, and when the first controllable switch is controlled to be in the off state, the second controllable switch is controlled to be in the on state.

16. The system of claim 15, wherein the circuit further comprises a switch controller configured to control the first controllable switch and the second controllable switch, wherein the switch controller is coupled to the power converter.

17. The system of claim 14, further comprising:
one or more additional switches configured to selectively couple a subset of LEDs within the first LED string to the power converter.

18. The system of claim 17,
wherein the system comprises a vehicle lighting system, wherein the first LED string corresponds to vehicle headlights and the second LED string corresponds to daytime running lamp (DRL) lighting of the vehicle, and wherein the one or more additional switches configured to selectively control high beams, low beams, and corner lighting via different light emitting diodes within the first LED string.

19. A method comprising:

delivering current through a first light emitting diode (LED) string and a second LED string in a complimentary fashion, such that when current flows through the first LED string approximately zero current flows through the second LED string, and when current flows through the second LED string approximately zero current flows through the first LED string;

measuring first current flow through the first LED string based on a first voltage difference between a first electrical contact and a second electrical contact, wherein the first voltage difference is based on a drop across a first current sensing resistor; and measuring second current flow through the second LED string based on a second voltage difference between the first electrical contact and the second electrical contact, wherein the second voltage difference is based on a voltage drop across both the first current sensing resistor and a second current sensing resistor.

20. The method of claim 19, further comprising:

delivering a different amount of current through the first LED string based on the measured first current flow; and/or delivering a different amount of current through the second LED string based on the measured second current flow.

\* \* \* \* \*